United States Patent
Ichikawa et al.

(10) Patent No.: US 12,443,377 B2
(45) Date of Patent: *Oct. 14, 2025

(54) PRINTER AND PRINTING SYSTEM THAT INITIALIZE COUNTER VALUE AFTER RESTRICTION PERIOD IS STARTED

(71) Applicant: BROTHER KOGYO KABUSHIKI KAISHA, Nagoya (JP)

(72) Inventors: Kazuki Ichikawa, Gamagori (JP); Yuichiro Sakuragi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,287

(22) Filed: Dec. 28, 2023

(65) Prior Publication Data

US 2024/0126487 A1    Apr. 18, 2024

Related U.S. Application Data

(63) Continuation of application No. 18/173,987, filed on Feb. 24, 2023, now Pat. No. 11,922,082.

(30) Foreign Application Priority Data

Mar. 17, 2022    (JP) .................. 2022-043141

(51) Int. Cl.
*G06F 3/12*    (2006.01)
(52) U.S. Cl.
CPC .......... *G06F 3/1239* (2013.01); *G06F 3/1203* (2013.01)

(58) Field of Classification Search
CPC ............................. G06F 3/1239; G06F 3/1203
See application file for complete search history.

(56) References Cited

U.S. PATENT DOCUMENTS

| | | | |
|---|---|---|---|
| 11,922,082 B2* | 3/2024 | Ichikawa | G06F 3/1285 |
| 2005/0275867 A1 | 12/2005 | Higashiura et al. | |
| 2008/0028448 A1* | 1/2008 | Tsuchitoi | G06F 3/1288 |
| | | | 726/6 |
| 2012/0192264 A1* | 7/2012 | Sugiyama | G03G 21/02 |
| | | | 726/16 |

(Continued)

FOREIGN PATENT DOCUMENTS

| | | |
|---|---|---|
| JP | 2002-055576 A | 2/2002 |
| JP | 2007-094084 A | 4/2007 |

OTHER PUBLICATIONS

Extended European Search Report dated Jan. 8, 2024 from related EP 23 15 9358.3.

(Continued)

*Primary Examiner* — Juan M Guillermety
(74) *Attorney, Agent, or Firm* — Scully, Scott, Murphy & Presser, PC (57) ABSTRACT

A printer has a function of restricting a number of printing during a particular period for each user ID. When printing is performed, a computer updates a counter value of the number of printing associated with a user ID corresponding to the printing, and restricts printing corresponding to the user ID when the counter value reaches an upper limit. When an individual operator is operated in an administrator PC, the computer initializes the counter value associated with the user ID corresponding the individual operator.

13 Claims, 8 Drawing Sheets

(56) References Cited

U.S. PATENT DOCUMENTS

2022/0057972 A1   2/2022   Nagano et al.

OTHER PUBLICATIONS

English Machine Translation of JP 2021-066085-A (Kondo, Published Apr. 30, 2021) Year: 2021).
Notice of Allowance dated Sep. 27, 2023 from parent U.S. Appl. No. 18/173,987.

* cited by examiner

RF: FUNCTION RESTRICTION PAGE

| User List/Restricted Functions | Functions | | | Page Limits | | | | Page Counters | | |
|---|---|---|---|---|---|---|---|---|---|---|
| | | | | Total Page Limits | | Color Page Limits | | All Counter Reset | | |
| | Print | Copy | Scan | On | Max. Pages | On | Max. Pages | Total | B&W | Color |
| Public Mode | ☑ | ☑ | ☑ | ☑ | 100 | ☐ | 0 | 0 | 0 | 0 |
| 1 UserA | ☑ | ☑ | ☑ | ☑ | 200 | ☑ | 50 | 50 | 0 | 50 |
| 2 UserB | ☑ | ☑ | ☑ | ☑ | 400 | ☑ | 100 | 100 | 80 | 20 |

Total Reset | B&W Reset | Color Reset (B2, B3, B4 — three rows)

Cancel (B5)   Submit (B6)

PRINTER AND PRINTING SYSTEM THAT INITIALIZE COUNTER VALUE AFTER RESTRICTION PERIOD IS STARTED

REFERENCE TO RELATED APPLICATIONS

This application is a continuation application of U.S. patent application Ser. No. 18/173,987 filed on Feb. 24, 2023 and claims priority under 35 U.S.C. § 119 from Japanese Patent Application No. 2022-043141 filed on Mar. 17, 2022. The entire subject matter of the application is incorporated herein by reference.

BACKGROUND ART

The present disclosures relate to a printer and a printing system.

There has conventionally been known an image forming device having a function to count the number of printing operations.

DESCRIPTION

In the conventional image forming device as described above, however, does not generally have a function to count the number of printing operations per user.

Aspects of the present disclosures suggest a printer which is advantageous in that the number of printing operations per user can be managed easily.

According to aspects of the present disclosures, there is provided a printer, comprising a memory and a controller, wherein the printer has a function of restricting a number of printing during a particular period for each user ID. The controller is configured to perform storing a restriction period and an upper limit in the memory in accordance with an instruction from a user interface, the restriction period being a period in which the number of printing is restricted for each user ID, the upper limit being an upper limit of the number of printing for each user ID, when the restriction period is started, initializing a counter value of the number of printing for each user ID, during the restriction period, when printing is performed, updating the counter value which is stored in the memory and associated with a user ID corresponding to the printing, when the counter value associated with the user ID reaches the upper limit, restricting printing corresponding to the user ID, causing the user interface to display an operation screen including the upper limit for each user ID, an individual operator for each user ID, and a common operator common to each user ID, when the individual operator is operated on the user interface, initializing the counter value associated with the user ID corresponding to the operated individual operator, when an operation to input the upper limit for the user ID is made on the user interface, changing the upper limit stored in the memory to the inputted upper limit, and when the common operator is operated on the user interface, initializing the counter value associated with each user ID.

According to aspects of the present disclosures, there is provided a printer, comprising a memory and a controller. The printer has a function of restricting a number of printing during a particular period for each user ID. The controller is configured to perform storing a restriction period and an upper limit in the memory in accordance with an instruction from a user interface, the restriction period being a period in which the number of printing is restricted for each user ID, the upper limit being an upper limit of the number of printing for each user ID, when the restriction period is started, initializing a counter value of the number of printing for each user ID, during the restriction period when printing is performed, updating the counter value which is stored in the memory and associated with a user ID corresponding to the printing, when the counter value associated with the user ID reaches the upper limit, restricting printing corresponding to the user ID, causing the user interface to display an individual screen including and an individual operator for each user ID, when the individual operator is operated on the user interface, initializing the counter value associated with the user ID corresponding to the operated individual operator without changing the upper limit for the user ID corresponding to the operated individual operator and without initializing the counter value associated with a user ID other than the user ID corresponding to the operated individual operator, and, before the restriction period is ended, updating the counter value associated with the user ID from the counter value initialized in response to operating of the individual operator.

According to aspects of the present disclosures, there is provided a printing system, comprising a terminal, a server, and a printer connected through a network to each other. The server comprises a memory and a controller. The controller is configured to perform storing a restriction period and an upper limit in the memory in accordance with an instruction from the terminal through the network, the restriction period being a period in which a number of printing is restricted for each user ID, the upper limit being an upper limit of the number of printing for each user ID, when the restriction period is started, initializing a counter value of the number of printing for each user ID, during the restriction period, when the printer performs printing, updating the counter value which is stored in the memory and associated with a user ID corresponding to the printing, when the counter value associated with the user ID reaches the upper limit, restricting printing corresponding to the user ID by the printing, causing the terminal to display an operation screen including the upper limit for each user ID, an individual operator for each user ID, and a common operator common to each user ID, when the individual operator is operated on the terminal, initializing the counter value associated with the user ID corresponding to the operated individual operator, when an operation to input the upper limit for the user ID is made on the terminal, changing the upper limit stored in the memory to the input upper limit, and when the common operator is operated on the terminal, initializing the counter value associated with each user ID.

According to aspects of the present disclosures, there is provided a printing system, comprising a terminal, a server, and a printer connected through a network to each other. The server comprises a memory and a controller. The printer has a function of restricting a number of printing during a particular period for each user ID. The controller is configured to perform storing a restriction period and an upper limit in the memory in accordance with an instruction from the printer through the network, the restriction period being a period in which a number of printing is restricted for each user ID, the upper limit being an upper limit of the number of printing for each user ID, when the restriction period is started, initializing a counter value of the number of printing for each user ID, during the restriction period, when the printer perform printing, updating the counter value which is stored in the memory and associated with a user ID corresponding to the printing, when the counter value associated with the user ID reaches the upper limit, restricting printing corresponding to the user ID, causing the terminal to display an individual screen including an individual operator for each user ID, when the individual operator is operated on the terminal, initializing the counter value associated with the user ID corresponding to the operated individual operator without changing the upper limit for the user ID corresponding to the operated individual operator and without initializing the counter value associated with a user ID other than the user ID corresponding to the operated individual operator, and before the restriction period is ended, updating the counter value associated with the user ID from the counter value initialized in response to operating of the individual operator.

Hereinafter, an embodiment according to the present disclosures will be described in detail. For the convenience of description, identical parts and materials are assigned with identical symbols, names and functions thereof being also identical. Therefore, descriptions of such members/functions will not be repeated.

Figure 1:
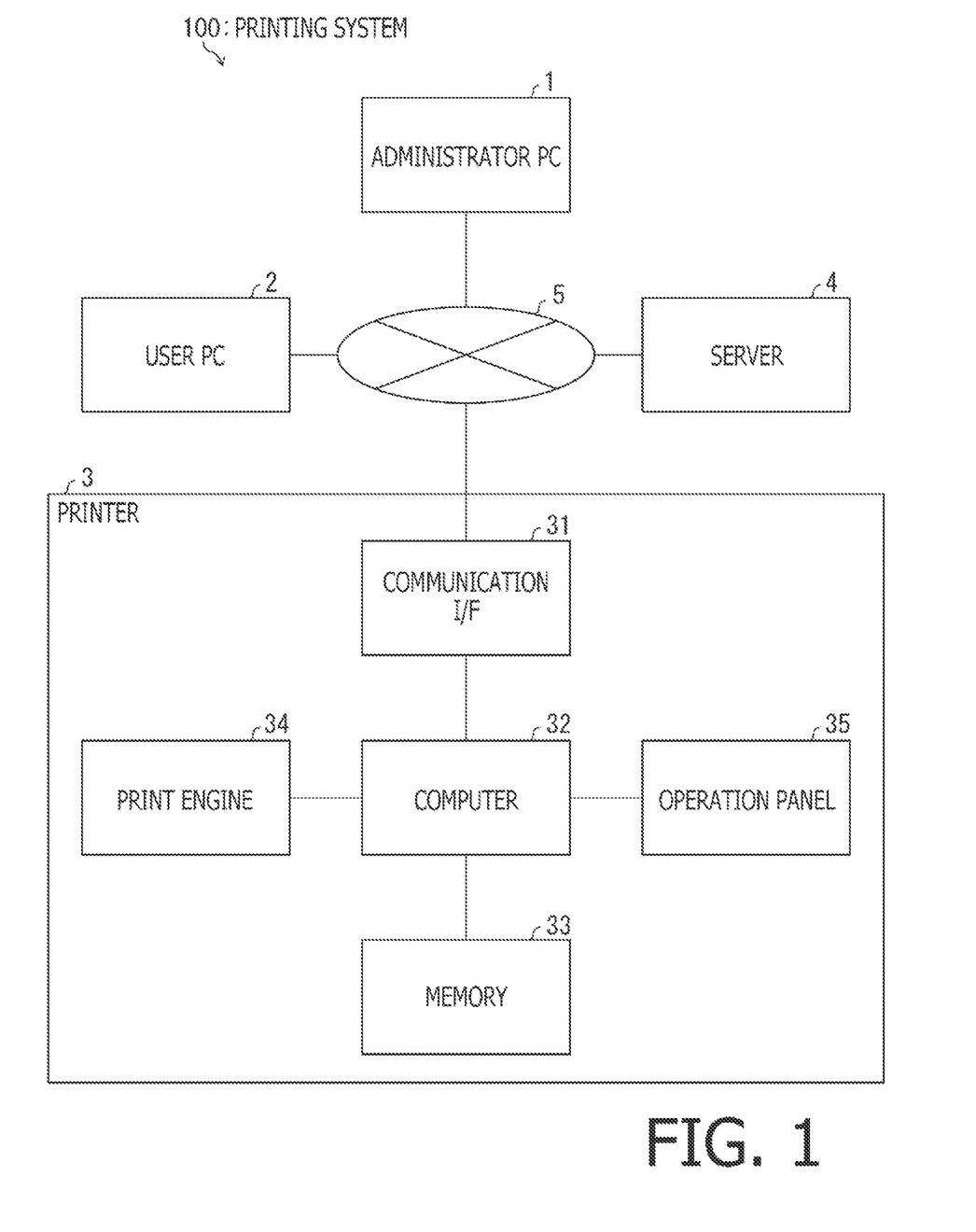
FIG. 1 is a block diagram showing a configuration of a printing system.

A printer 3 shown in FIG. 1 is a multifunction device equipped with copy, printer, scanner, and facsimile functions. It is noted, however, the printer 3 according to the present disclosures is not necessarily limited to those equipped with all of the above four functions. Rather, the printer 3 according to the present disclosures need only be equipped with at least the printer function.

Hereinafter, a printing system 100 will be described with reference to FIGS. 1 through 8. As shown in FIG. 1, the printing system 100 includes an administrator PC 1, a user PC 2, the printer 3, and a server 4, which are communicatively connected to each other via a network 5.

As shown in FIG. 1, the printer 3 has a communication OF (interface) 31, a computer 32, a memory 33, a print engine 34, and an operation panel 35.

The communication OF 31 is an interface enabling communication among the administrator PC 1, the user PC 2, and the server 4 via network 5. The computer 32 is an example of a controller according to aspects of the present disclosures and is configured to control the entire operation of the printer 3. A memory 33 is a storage area for the computer 32 to read and write data. The print engine 34 is a mechanism configured to print images stored in the memory 33 upon receiving instructions from the computer 32. The operation panel 35 is operated by the user to perform copying, scanning operations, and the like, and by the administrator to limit the number of printing pages per user.

Figure 2:
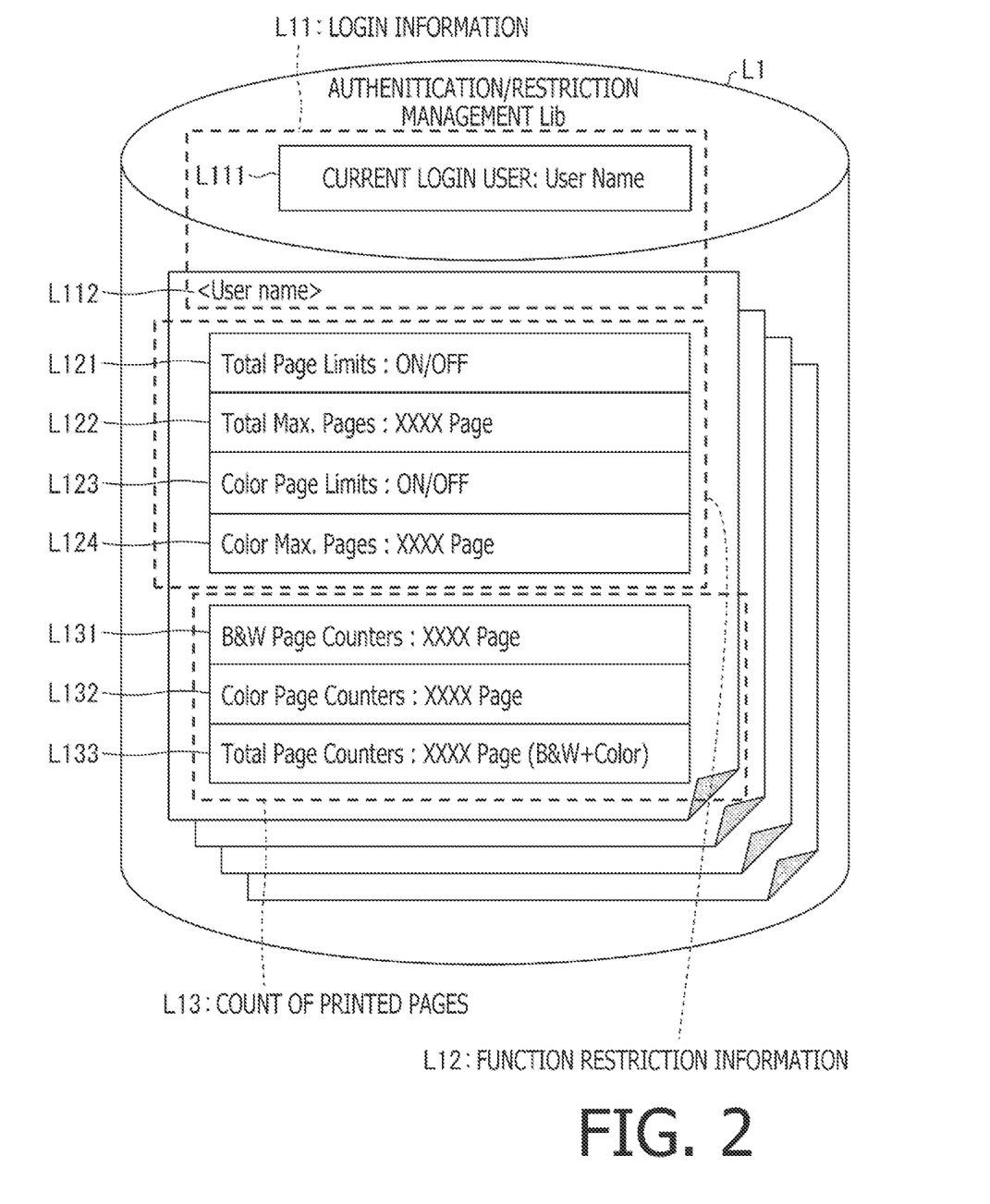
FIG. 2 shows a configuration of authentication/restriction management library.

As shown in FIG. 2, an authentication/restriction management Lib (library) L1 is a library managing information of all the users. Data of the authentication/restriction management Lib L1 is stored in a non-volatile storage area in the memory 33 of the printer 3. The authentication/restriction management Lib L1 contains login information L11, function restriction information L12 and a count of printed pages L13.

Figure 3:
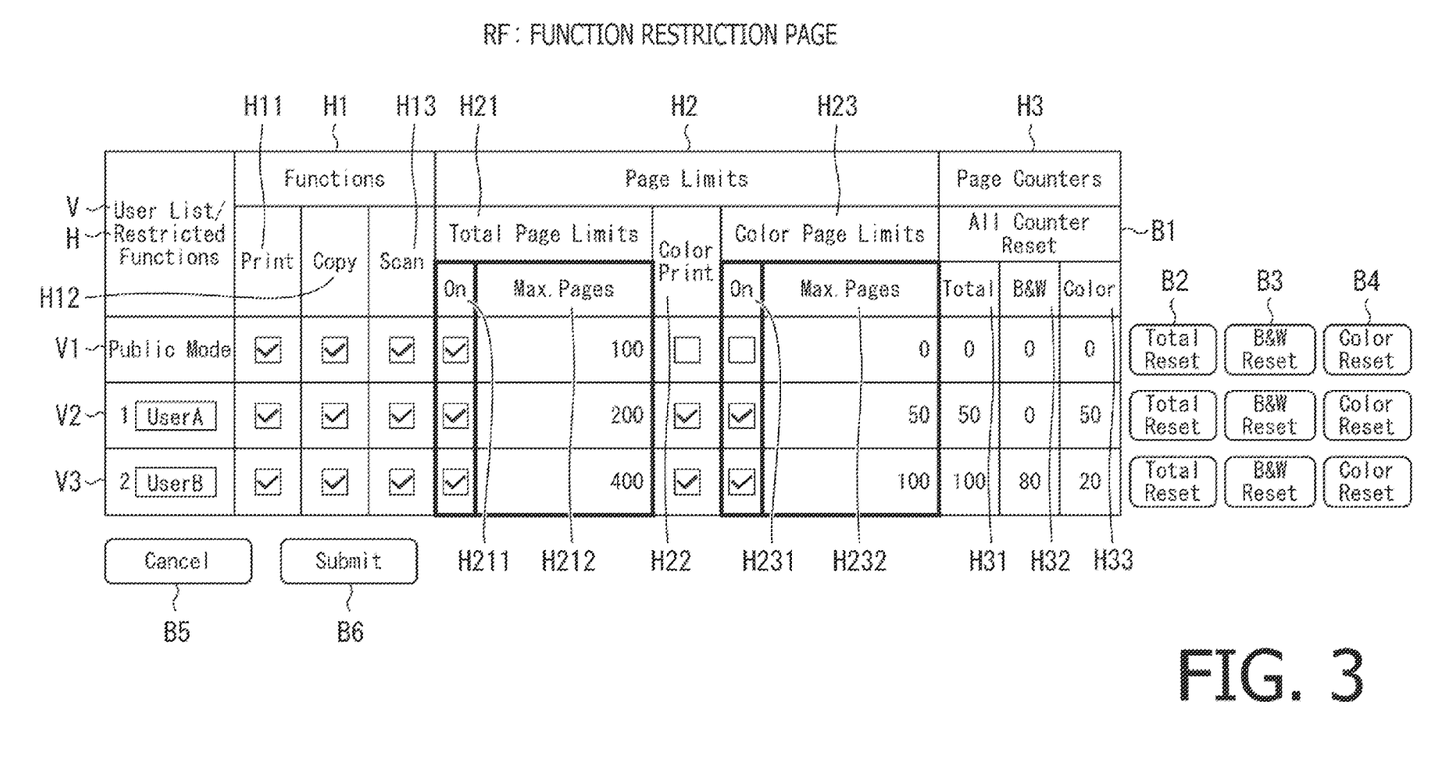
FIG. 3 shows a layout of a function restriction page.

FIG. 3 shows a configuration of a function restriction page RF. The function restriction page RF has respective fields for a User List V along a vertical direction, while respective fields for Restricted Functions H along a horizontal direction.

Processes described below are basically processes performed by the computer 32 which follows instructions described in programs. That is, processes to "select," "receive," "control," and the like in the following description are processes performed by the computer 32. The processes performed by the computer 32 include hardware control using an API of the OS. In the specification, operations of each program will be described with omitting the description of the OS. That is, a description such as "a program B controls hardware C" may be understood such that "a program B controls hardware C using the API of the OS." Further, processes of the computer 32 following instructions described in a program may be recited in a simplified manner. For example, "the computer 32 performs a process in accordance with an instruction described in a program" may be simply described such that "the computer 32 performs a process." Alternatively, "the computer 32 performs a process in accordance with an instruction described in a program A" may be simply described such that "the program A performs a process."

An example of a medium in which programs are stored is not necessarily limited to the memory 33 built in the printer 3, but another computer-accessible (i.e., computer-readable, and computer-writable) storage medium from which the computer 32 retrieve data/information and to which the computer 32 write data/information. The computer-readable storage medium is a non-transitory medium. The non-transitory medium includes, beside the above example, storage media such as a CD-ROM and a DVD-ROM. Further, the non-transitory medium is a tangible medium. In contrast, an electrical signal carrying a program which is downloaded from a server on the Internet or the like is a computer-readable signal medium which is one type of the computer-readable media but not included in the non-transitory computer-readable storage media.

The term "data" in this specification is represented by a computer-readable bit array. Two or more pieces of data having the same substantive semantic contents but different formats will be treated as the same data. The same applies to "information" in this specification. Further, "instruct" is a concept indicating that information indicating "instructing" is output. Further, information that indicates "instructing" will be simply referred to as an "instruction."

Further, a process in which the computer 32 determines whether or not information A represents fact A may be conceptually described such that "the computer 32 determines whether a fact is the fact B or not based on information A." Furthermore, a process in which the computer 32 determines whether information A represents fact B or fact C may be conceptually described such that "the computer 32 determines whether a fact is the fact B or the fact C based on information A."

Figure 4:
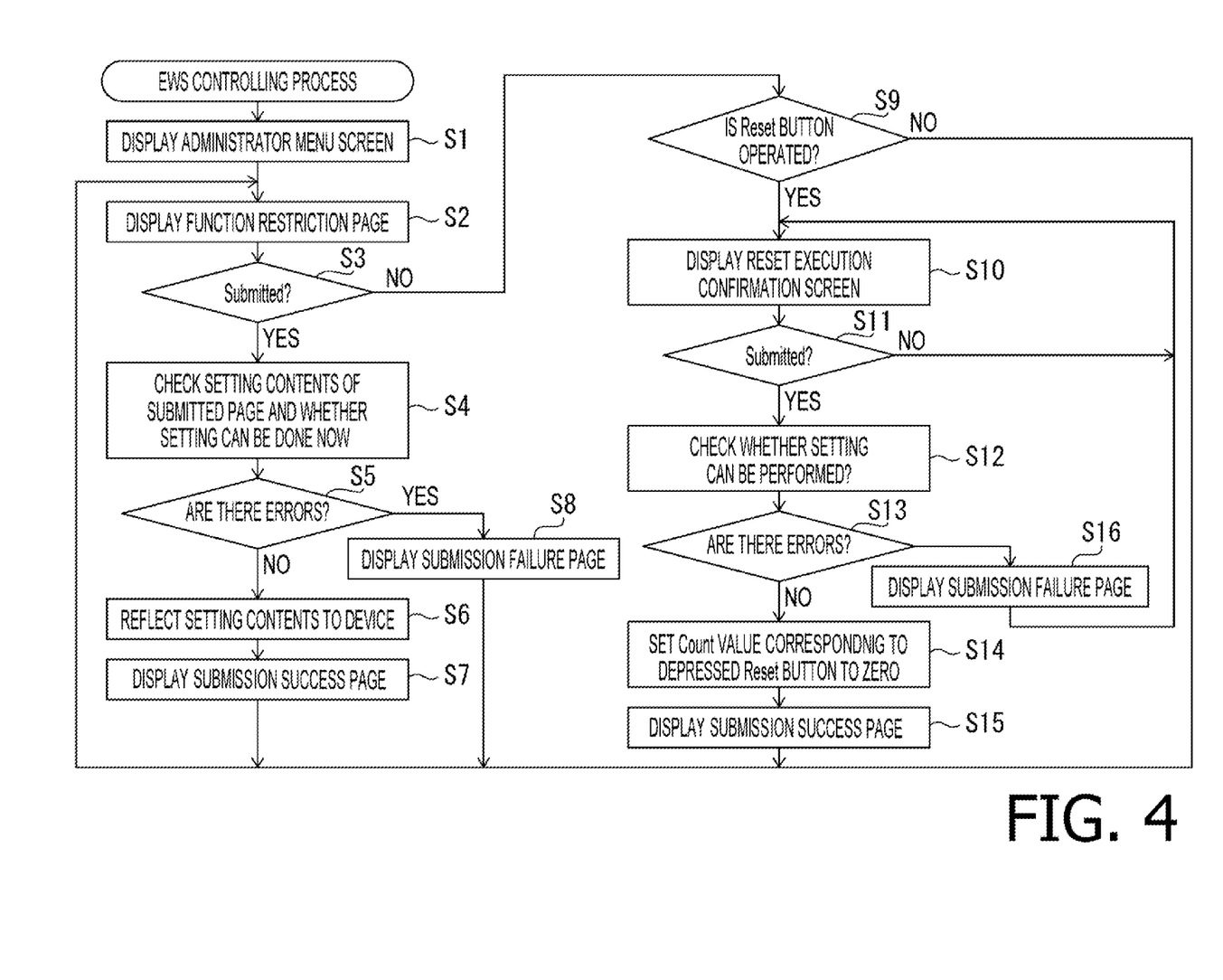
FIG. 4 is a flowchart illustrating an EWS controlling process.

Referring to FIG. 4, an EWS control process in the administrator PC 1 will be described. The EWS control process is started when the administrator accesses the EWS with the administrator computer PC 1. It is noted that the EWS is a webserver implemented in the printer 3.

When detecting an access from the administrator PC 1 to the EWS, the printer 3 transmits Web page data to the administrator PC 1 to display an administrator login screen on a browser of the administrator PC 1 (S1). The administrator PC 1 is an example of a user interface according to aspects of the present disclosures. In the Web page data, data used for displaying various screens, including the administrator login screen, is included, and data for displaying respective pages, including a function restriction page RF (described later), is included. When detecting that an administrator password through the administrator login screen, the printer 3 transmits display permission data for an administrator menu screen to that the administrator menu screen is displayed on the browser of the administrator PC 1. On the administrator menu screen, various pages such as the function restriction page RF shown in FIG. 3, a function setting page and the like, can be selected. The function restriction page RF is an example of an operation screen according to aspects of the present disclosures.

In S2, the administrator PC 1 displays the function restriction page RF shown in FIG. 3 in accordance with a selection operation by the administrator on the administrator menu screen.

As shown in FIG. 3, as the User List V of the function restriction page RF, fields of "Public Mode" V1, "UserA" V2 and "UserB" V3 are arranged. A line of the "UserA" V2 shows functions that are usable by the UserA and restriction states of the functions. A line of the "UserB" V2 shows functions that are usable by the UserB and restriction states of the functions. A line of the "Public Mode" V1 shows functions that are usable by users other than the particular user and restriction states of the functions. It is noted that check marks indicate that functions (i.e., functions of which check boxes are checked with check marks) or restrictions (restrictions of which check boxes are checked with check marks) are effective.

In a line of "Restricted Functions" H, "Functions" H1, "Page Limits" H2 and "Page Counters" H3 are arranged.

The "Function" H1 indicates usable functions, and includes "Print" H11, "Copy" H12 and "Scan" H13. Optionally, the "Function" H1 may include functions of "Facsimile," "USB," "Server Connection," "Application," and the like as usable functions, and usage settings may be made.

When a "Submit" button B6 is operated (S3: YES), the administrator PC 1 executes a process of S4. When the "Submit" button B6 is not operated (S3: NO), the administrator PC 1 executes a determination process of S9.

The setting contents will be described below prior to explaining checking of setting contents. In the function restriction page RF, fields of the "Page Limits" H2 indicate limitations of print pages, which are divided to "Total Page Limits" H21, "Color Print" H22, and "Color Page Limits" H23. The "Total Page Limits" H21 is further divided to "On" H211, and "Max. Pages" H212. The "Max. Pages" H212 is an example of a first upper limit value according to aspects of the present disclosures.

The "Color Print" H22 represents whether usage of color printing is permitted or not.

The "Color Page Limits" H23 is divided into "On" H231 and "Max. Pages" H232. The "Max. Pages" H232 is an example of a second upper limit value according to aspects of the present disclosures. When the "Color Print" H22 is effective, the setting of the "Color Page Limits" H23 is effective.

The field of the "Page Counters" H3 represents the count of printed pages, and is divided into "Total" H31, "B&W" H32, and "Color" H33.

In the function restriction information L12 of the authentication/restriction management Lib L1, the "Total Page Limits" L121 of the Job executing user represents effective/ineffective of a function of restricting the total counts of printed pages of the monochrome and color printing for each user. The function of restricting the total counts of printed pages is effective when set to "On" (i.e., checked) and ineffective when set to "OFF" (i.e., "On" is not checked). To the "Total Page Limits" L121, the setting of "On" H211 of the function restriction page RF is reflected.

The "Total Max. Pages" L122 is an example of an upper limit value according to aspects of the present disclosures, and the setting value of the maximum counts of printable pages of the monochrome and color printing per user. To the "Total Max. Pages" L122, the setting of the "Max. Pages" H121 of the function restriction page RF is reflected.

The "Color Page Limits" L123 represents effective/ineffective of a function of restricting the count of pages of color printing, and the function of restricting the total count of printed pages is effective when set to "ON" (i.e., checked) and ineffective when set to "OFF" (i.e., not checked). To the "Color Page Limits" L123, the setting of the "On" H231 of the function restriction page RF is reflected.

The "Color Max. Pages" L124 is an example of an upper limit value according to aspects of the present disclosures, and is the setting value of the maximum count of printable pages of color printing. To the "Color Max. Pages" L124, the setting of the "Max. Pages" H232 of the function restriction page RF is reflected.

In S4, the administrator PC 1 transmits data representing the setting contents of the function restriction page RF on which the "Submit" button B6 is operated to the printer 3, and the printer 3 checks the setting contents.

In the checking of the setting contents, three items regarding the setting of the "page count restriction" are performed.

Firstly, when the "Total Page Limits" H21 or the "Color Page Limits" H23, which is the "page count restriction" is ON, but the "Max. Pages" H212 or the "Max. Pages" H232 is zero (0), the check result is determined to be an error. It is because, when the "Max. Pages" H212 or the "Max. Pages" H232 is zero, even one page of printing cannot be performed. It is noted that, the determination is not limited to a determination of 0 or not. For example the determination may also be made whether or not the "Max. Pages" H212 or the "Max. Pages" H232 is less than a relatively small page count (i.e., a threshold value such as 10 pages or less) or not.

Secondly, when a value of one or more is set to the "Max. Pages" H212 or the "Max. Pages" H232 when the page count restriction is OFF, the check result is determined to be an error. It is because there is a possibility that the user forgot to set the "page count restriction" to ON.

Thirdly, when the value of the "Max. Pages" H232 for Color is greater than the value of the "Max. Pages" H212, the check result is determined to be an error. The Total number of pages is the sum of the page count of the B&W and the page count of the Color. Therefore, the page count of the "Color" never be greater than the Total number of pages, and there is a possibility that the administrator has input the number in function restriction page RF erroneously.

When it is checked that the setting can be performed currently, the error determination is made when a print Job is being performed. It is because, if the setting of the "page count restriction" or the resetting of the "Counter" is performed when the print Job is being performed, it becomes necessary to determine whether the currently performed Job is continued with the previous setting or the updated setting, and control of the print job becomes complicated.

When no errors are detected in the checking (S5: NO), the printer 3 executes a process of S6. When there is an error in the checking (S5: YES), the printer 3 executes a process of S8.

In S6, the printer 3 stores the ON/OFF settings of the "Total Page Limits" H21 and the "Color Page Limits" H23, the page count setting of the "Max. Pages" H212 or the "Max. Pages" H232 in the authentication/restriction management Lib L1 in the memory 33.

If the Web page data contains a program to check the setting contents, and if the administrator PC 1 checks the setting contents and no errors are found, data representing the setting contents may be transmitted and may be stored in the authentication/restriction management Lib L1 in the memory 33.

Since the count value is not a setting value but a history of the count of pages having been printed, the count value is not changed when the "Submit" button B6 is operated on the functions restriction page RF.

By transmitting data representing the successful storage of the settings, the printer 3 causes the administrator PC 1 to display a submit success page such as "Submit OK" in S7.

By transmitting data representing an error, the printer 3 causes the administrator PC 1 to display a failure page such as "Submit Error" in S8. On the "Submit failure" page, details of a problem and a method of addressing the same are indicated. For example, for the administrator, a message "If you input a maximum page limit count, please confirm that a page limit is turned on" is displayed.

Figure 5:
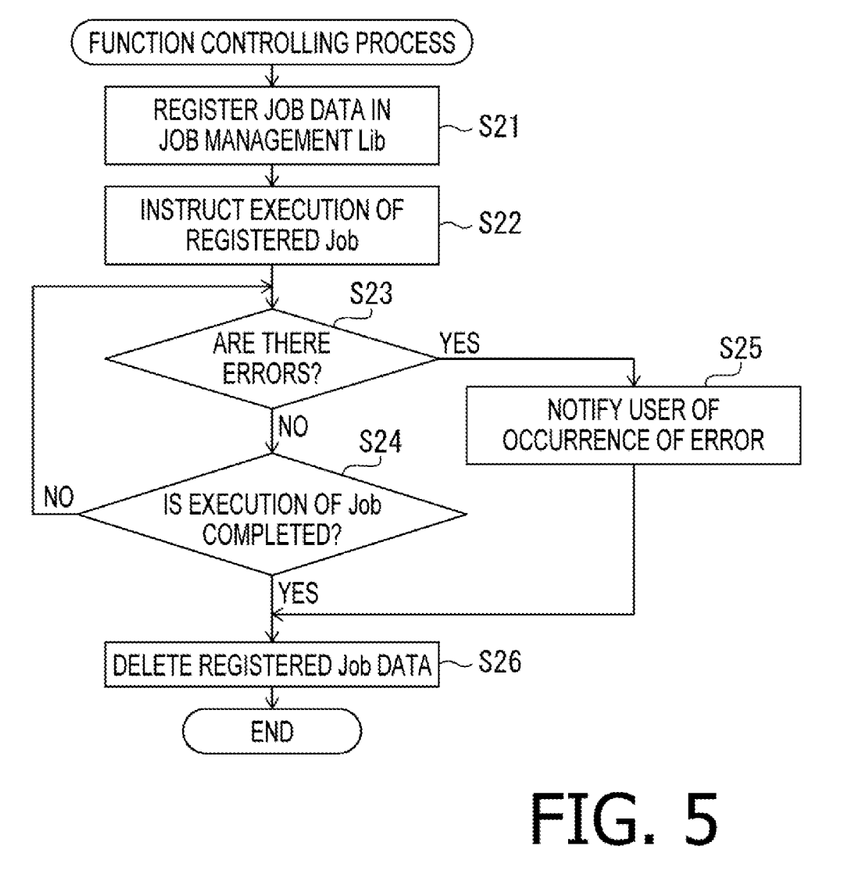
FIG. 5 is a flowchart illustrating a function controlling process.

Before explaining a process in S9, a printable page count restricting process performed in the printer 3 will be described with reference to FIGS. 5-8. A function restricting process shown in FIG. 5 is started as a task when, for example, the printer 3 has received a print Job from the user PC 2, when the printer performs an original document reading process in response to a copying operation through an operation panel, or the like. When the printing is normally completed, or terminated due to an error, the function restricting process as a task is extinguished.

Figure 6:
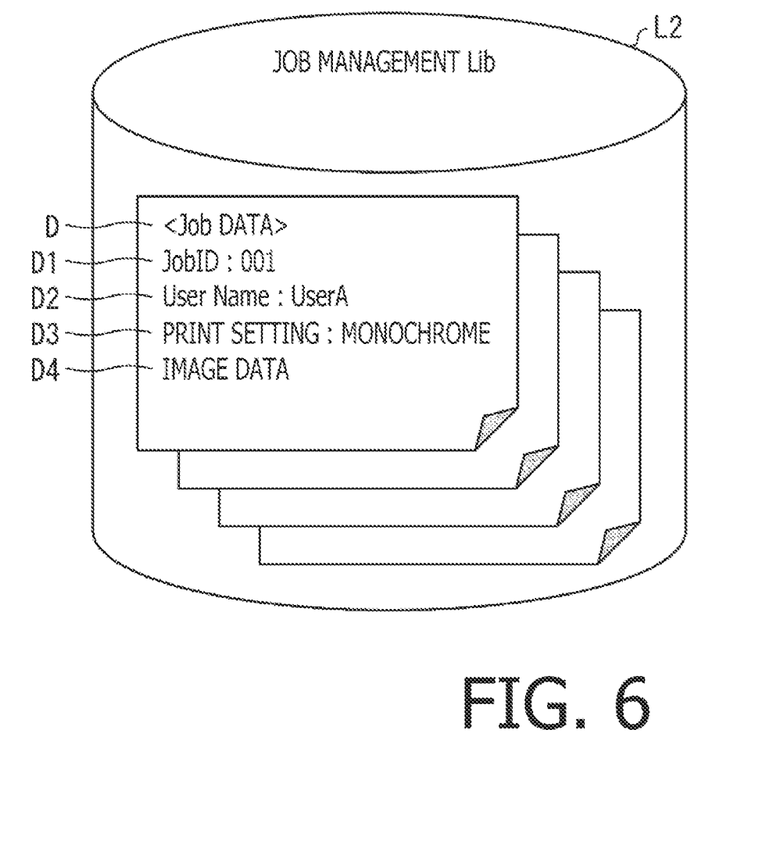
FIG. 6 shows a configuration of a Job management library.

In S21 (see FIG. 5), the computer 32 registers Job data D with a Job management library L2 shown in FIG. 6.

When receiving a print Job from the user PC 2 or when an operation such as a copying operation is performed on the operation panel 35 of the printer, the computer 32 registers the Job data D in the Job management library L2 in the memory 33.

There are three possibilities to execute a print job received from the user PC 2. First, there are cases in which a print job including a user name is executed without storing the job. Second, there are cases in which a print job including a user name is stored and executed when the user logs in. Third, there are cases in which a job including a user name and password is stored, and the job is executed when the user enters the password.

The computer 32 of the printer 3 analyzes the received print Job, and registers a User name D2, a print setting D3, and image data D4, which are obtained as a result of the analysis, with the Job management library L2 as the Job data D. The print setting D3 represents whether the monochrome printing or the color printing is to be performed, and the size of the printing sheet. It is note that print setting included in the print job, but also print setting stored in the memory of the printer may be registered as the print setting D3. The print setting D3 is an example of a print condition according to aspects of the present disclosures.

The job management library L2 shown in FIG. 6 is stored in the non-volatile storage area of the memory 33 of the printer 3. In the Job management library L2, Job data D including Job ID D1, a User name D2, print settings D3, and image data D4 are registered. The Job ID D1 is assigned to each job data D. The User name D2, the print settings D3, and the image data D4 are associated with the Job ID D1. In this way, by specifying the Job ID, each process can obtain the User name D2, the print settings D3, and the image data D4 associated with the Job ID D1.

In S22, the computer 32, in the job control process, executes a job pertaining to the job data D registered in the Job management library L2. At this time, in the function restricting process, the print instruction containing the Job ID is transmitted to the Job controlling process.

When an occurrence of an error is not notified from the Job controlling process (S23: NO), the computer 32 executes a determination process of S24. When the occurrence of an error has been notified (S23: YES), the computer 32 executes a process of S25.

When notified, by the Job controlling process, that the Job has been completed (S24: YES), the computer 32 executes a process of S26. When the completion of the Job has not been notified (S24: NO), the computer 32 returns to the process of S23.

In S25, the computer 32 notifies the user that an error has occurred. For example, the computer 32 displays that an error has occurred on the user PC 2 or on the operation panel 35. Thereafter, the computer 32 executes a process of S26.

In S26, the computer 32 removes the Job data D, which has been registered in S21, from the Job management library L2.

Figure 7:
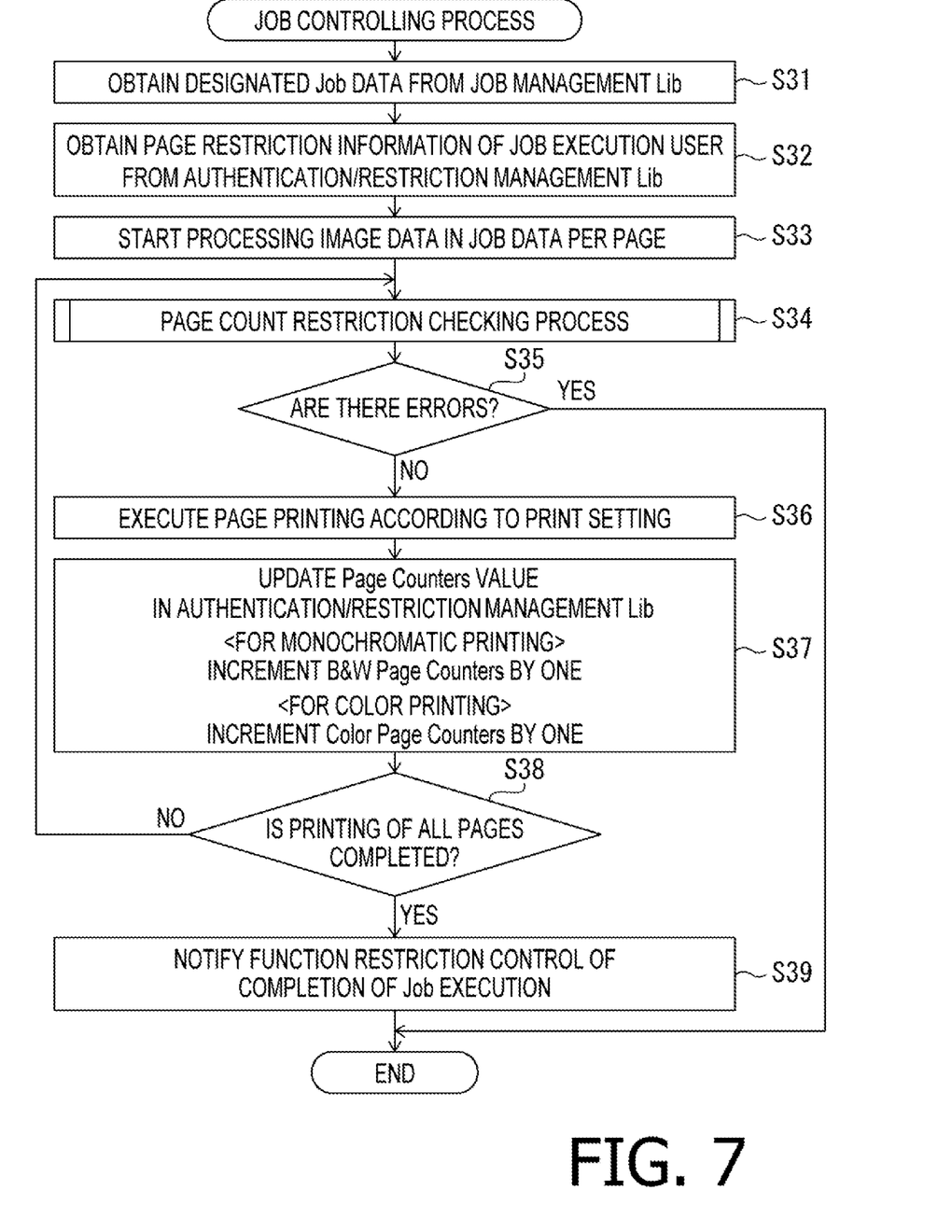
FIG. 7 is a flowchart illustrating a job controlling process.

Regarding the Job controlling process shown in FIG. 7, it is invoked as a task in advance, while the Job controlling process is started when a Job execution instruction regarding the Job data D registered in the Job management library L2 is given. The Job controlling process is terminated when the printing is successfully completed or an error has occurred. It is noted that the Job controlling process resides as a task and waits for another execution instruction.

In S31, the computer 32 obtains the job data D pertaining to the job instructed to be executed by the function restricting process from the Job management library L2. From the function restricting process to the Job controlling process, a printing instruction including the Job ID D1 is given, so the computer 32 identifies the Job data D based on the Job ID D1.

In S32, the computer 32 obtains page restricting information for the user who executes the Job from the authentication/restriction management Lib L1. At this time, the computer 32 checks the User name L112 registered in the authentication/restriction management Lib L1 against the User name D2 in the job data D to confirm the Job executing user.

Since the Job data D obtained in S31 contains the User name D2, the computer 32 checks whether the User name D2 is contained in the authentication/restriction management Lib L1. When the User name D2 is contained in the authentication/restriction management Lib L1, the computer 32 identifies the User name D2 as the Job executing user. If the User name D2 does not exist in the authentication/restriction management Lib L1, or if the User name D2 is "Public," "Public" is identified as the Job executing user.

The computer 32 may identify a current login user name L111 currently logging in the printer 3 and stored in the authentication/restriction management Lib L1 as the Job executing user. In addition to printing a received job, when printing is performed by a copy operation or when image data stored in a USB memory is printed, the login user name of the printer 3 is registered in the job management library L2 as the current login user name L111 in the login information L11. Therefore, the computer 32 may identify the login user name L111 as the Job executing user. If no user has logged into the printer 3, or if the received print job does not contain a user name, the computer 32 may register "Public" as the login user name L111 and identify the login user name L111 as the Job executing user.

Then, the computer 32 obtains the page restriction information for the identified Job executing user from the function restriction information L12 of the authentication/restriction management Lib L1.

In S33, the computer 32 starts processing, on a page basis, the image data D4 contained in the Job data D obtained in S31. Specifically, the computer 32 executes processes S34, S35, S36 and S37 for each page.

Figure 8:
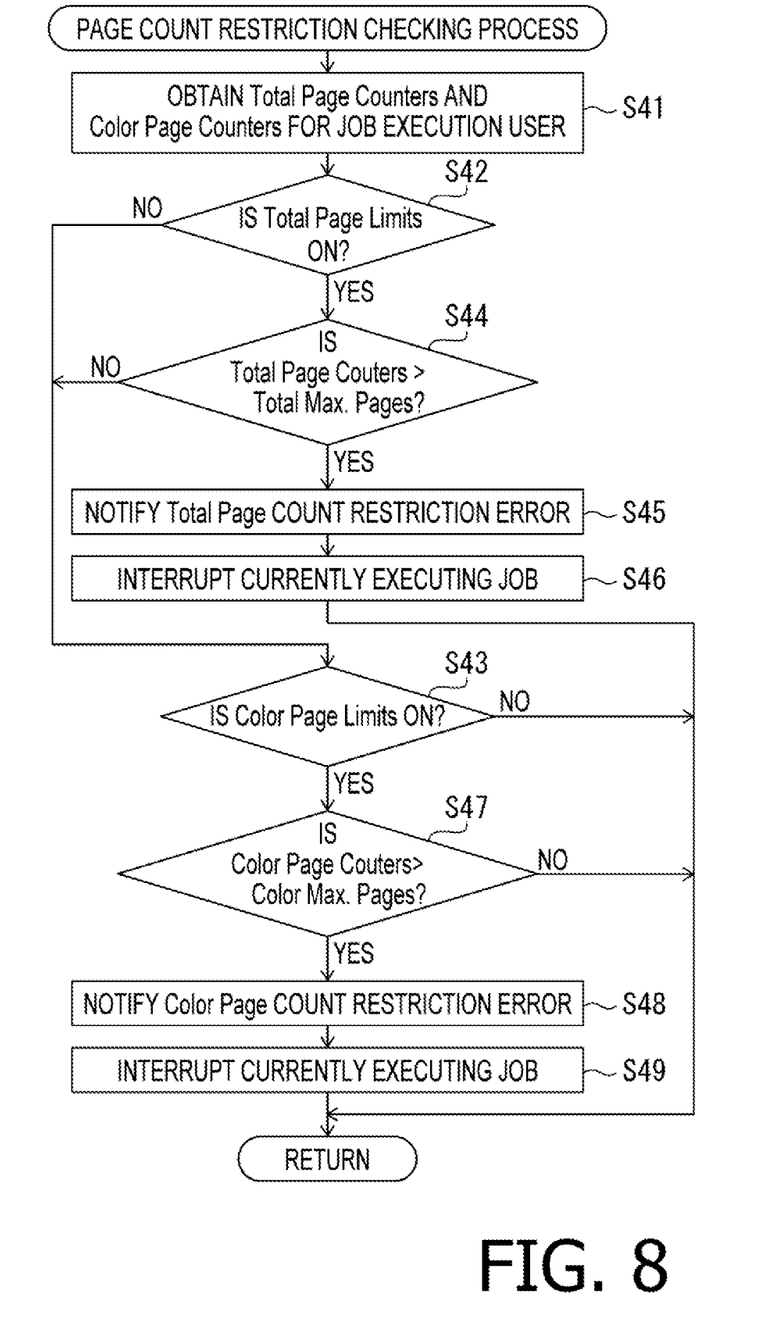
FIG. 8 is a flowchart illustrating a page number limit checking process.

In S34, the computer 32 executes a page count restriction checking process shown in FIG. 8. Before providing a description on FIG. 8, the count of printed pages L13 in the authentication/restriction management Lib L1 will be described.

A "B&W Page Counters" L131 is an example of a counter value for the count of pages printed in monochrome, which is counted up and stored when a monochrome Page print is successful. A "Color Page Counters" L132 is an example of a counter value for the count of pages printed in color, which is counted up and stored when a color Page print is successful. A "Total Page Counters" L133 is the sum of the "B&W Page Counters" L131 and the "Color Page Counters" L132, and is calculated and retrieved when a request is made to retrieve the value to the authentication/restriction management Lib L1. Therefore, the value of the "Total Page Counters" L133 is not stored in the non-volatile storage area of the memory 33.

It is noted that the "B&W Page Counters" L131 and the "Color Page Counters" L132 are example of a second counter value. The "Total Page Counters" L133 is an example of a first counter value. Next, FIG. 8 will be described.

In 541, the computer 32 obtains values of the "Total Page Counters" L133 and the "Color Page Counters" L132 of the Job executing user from the page restriction information obtained in S32.

When the "Total Page Limits" is "ON" (S42: YES), the computer 32 performs a determination in S44. When the "Total Page Limits" L121 is not "ON" (S42: NO), the computer 32 performs a determination in S42.

In S43, the computer 32 obtains the "Color Page Limits" L123 of the job executing user from the page restriction information obtained in S32. When the "Color Page Limits" L123 is "ON" (S43: YES), the computer 32 executes a determination in S47. When the "Color Page Limits" L123 is not "ON" (S43: NO), the computer 32 returns to the Job controlling process (FIG. 7) and executes a determination in S35.

When the value of the "Total Page Counters" L133 is greater than the value of the "Total Max. Pages" L122 (S44: YES), the computer 32 executes a process of S45. When the value of the "Total Page Counters" L133 is not greater than the value of the "Total Max. Pages" L122 (S44: NO), the computer 32 executes a determination in S43.

In S45, the computer 32 notifies the function restricting process that the occurrence of a total page restriction error together with the job ID. For example, an occurrence of an error is notified from the Job controlling process to the function restricting process using an inter-task communication.

In S46, the computer 32 interrupts processing of the Job currently being executed, returns to the Job controlling process (FIG. 7) and executes the determination in S35.

When a value of the "Color Page Counters" L132 is greater than a value of the "Color Max. Pages" L124 (S47: YES), the computer 32 executes a process of S48. When the value of the "Color Page Counters" L132 is not greater than the value of the "Color Max. Pages" L124 (S47: NO), the computer 32 executes a process of S36.

In S48, the computer 32 notifies the function restricting process that an occurrence of a Color Page restriction error together with the job ID. For example, the occurrence of the error is notified from the Job controlling process to the function restricting process using the inter-task communication.

In S49, the computer 32 interrupts processing a job currently being executed, returns to the Job controlling process (FIG. 7), and executes the determination in S35.

Returning to FIG. 7, when there are no errors in the page count restriction checking process (S35: NO), the computer 32 executes a process of S37. When there is an error (S35: YES), the computer 32 terminates the Job executing process and waits for another Job execution instruction from the function restricting process.

In S36, the computer 32 executes a Page printing in accordance with the print setting D3 contained in the Job data D obtained in S31.

In S37, the computer 32 updates the value of the count of printed pages L13 in the authentication/restriction management Lib L1. In detail, if the print setting D3 of the "Job Data" D is monochrome, the computer 32 adds 1 to the value of "B&W Page Counters" L131. If the print setting D3 of the "Job Data" D is color, the computer 32 adds 1 to the value of the "Color Page Counters" L132.

When all the "Page printing" has been completed (S38: YES), the computer 32 executes a process of S39. When all the "Page printing" has not been completed (S38: NO), the computer 32 returns the process of S34.

In S39, the computer 32 notifies the function restricting process that the execution of the "Job" is completed. For example, a notification of completion of Job execution is given from the Job controlling process to the function restricting process using the inter-task communication. Thereafter, the computer 32 terminates the Job execution process and waits for another Job execution instruction from the function restricting process.

Here, the description is returned to the EWS controlling process shown in FIG. 4.

When any of the Rest buttons B1-B4 is operated (S9: YES), the administrator PC 1 executes a process of S10.

When the "Submit" button B6 has not been operated (S3: NO) and the "Reset" button (B1-B4) has not been operated (S9: NO), it is assumed that the "Cancel" button B5 has been operated. The "Cancel" button B5 is to be operated to stop setting the function restriction page RF.

The "Reset" buttons include an "All Counter Reset" button B1 for all users, a "Total Reset" button B2, a "B&W Reset" button B3, and a "Color Reset" button B4 for each user. The "All Counter Reset" button B1 is an example of a common operator and is operated to reset the count of printed pages for all users The "Total Reset" button B2, the "B&W Reset" button B3 and the "Color Reset" button B4 are examples of an individual operator, and arranged corresponding to the "Public Mode" V1, the "UserA" V2 and the "UserB" V3, respectively. The "Total Reset" button B2 is an example of a first operator. The "B&W Reset" button B3 and the "Color Reset" button B4 are examples of a second operator.

In S10, the administrator PC 1 displays a reset execution confirmation screen (not shown). The reset execution confirmation screen displays an indication such as "Click "Submit" to rest a page counter value. As a precaution, the counter value is reset and cannot be restored." may be displayed in addition to the display of the "Submit" button.

When the "Submit" button is operated on the reset execution confirmation screen (S11: YES), the administrator PC 1 executes a process of S12. When the "Submit" button is not operated (S11: NO), the administrator PC 1 returns to the process of S10.

In S12, the administrator PC 1 transmits data representing a type of the operated "Reset" button to the printer 3 to check whether the printer 3 can be reset. In the check whether the printer 3 can be reset, an error is made if a print Job is running.

It is noted that the administrator PC 1 may transmit data representing the setting contents and data representing the type of operated Reset button to the printer 3, and the printer 3 may check the setting contents as in S4.

When no errors are found in the check (S13: NO), the printer 3 executes a process of S14. When an error is found in the check (S13: YES), the printer 3 executes a process in S16.

In S14, the printer 3 sets the "Count" value corresponding to the "Reset" button operated in S9 to zero (0). Setting the "Count" value to zero is an example of initialization.

Specifically, when the "All Counter Reset" button B1 is operated in the function restriction page RF, the "B&W Page Counters" L131 and the "Color Page Counters" L132 for all users in the authentication/restriction management Lib L1 are set to zero. The "B&W Page Counters" L131, the "Color Page Counters" L132 and the "Total Page Counters" L133 are included in the count of printed pages L13.

When the "Total Reset" button B2 is operated in the function restriction page RF, the "B&W Page Counters" L131 and the "Color Page Counters" L132 for a user corresponding to the operated button in the authentication/restriction management Lib L1 are set to zero.

When the "B&W Reset" button B3 is operated in the function restriction page RF, the "B&W Page Counters" L131 for the user corresponding to the operated button in the authentication/restriction management Lib L1 is set to zero.

When the "Color Reset" button B4 is operated in the function restriction page RF, the "Color Page Counters L132 for the user corresponding to the operated button in the authentication/restriction management Lib L1 is set to zero.

In S15, the printer 3 transmits data indicating that the reset is successfully performed, thereby causing the administrator PC 1 to display a Submit success page indicating a message such as "Page count was Reset successfully."

In S16, the printer 3 transmits data indicating that the reset is failed, thereby causing the administrator PC 1 to display a Submit failure page indicating a message such as "The Reset was unsuccessful." On the Submit failure page, details of problems and how to address the same are described. For example, for the administrator, a message such as "Retry after confirming the device is not currently used or the setting is not made by another user." may be displayed. Thereafter, the administrator PC 1 returns to the process of S10. The EWS control process is terminated when an operation instructing logout is performed on the administrator menu screen, when an operation instructing termination is performed by the administrator on the administrator menu screen, or when no operation is detected for a particular period of time or longer.

The display of each success page and/or failure page in S7, S8, S15, and S16 may be displayed on the administrator PC 1 as the printer 3 transmits the web page data of the success page and/or failure page to the administrator PC 1.

The above shows an example of displaying the administrator menu screen, function restriction page RF, and the like on a browser of the administrator PC 1, but they may be displayed on a device other than the administrator PC 1 to allow configuration of the printer 3. For example, the administrator menu, the function restriction page RF and the like may be displayed on the operation panel of the printer 3. The operation panel 35 is an example of a user interface.

The printer 3 may be configured such that the setting information can be set in accordance with a method different from the EWS controlling process. For example, the printer 3 may be configured such that, upon receiving a request from a requesting source device to "rest the Total Page Counters for a user A," the printer 3 may set zero to the "B&W Page Counters" L131 and the "Color Page Counters" L132 associated with the user A in the authentication/restriction management Lib L1.

In the embodiment described above, the count of pages to be printed is managed, but the count of sheets to be printed may be managed. The count of pages to be printed and the count of sheets to be printed are examples of the count of prints.

The above is an explanation of the operation of the printing system 100. An example of an effective usage of the Reset button will be described. For example, if the administrator wants to limit the total count of pages to be printed by a user per month, the administrator should set the Automatic Page Counter Reset function in such a manner that each "Page Counters" will be automatically reset in one month, check the checkbox "On" H 211, and enter the total count of pages that can be printed in a month in the "Max. Pages" H212. If the administrator further wants to limit the count of color pages to be printed, the administrator should check the checkbox "On" H231 of the "Color Page Limits" H23 in the function restriction page RF and enter the count of color pages that can be printed in a month in the "Max. Pages" H232.

The Automatic Page Counter Reset function is a function available in the authentication/restriction management Lib L1 that automatically resets the value of a count of printed pages (L13) to 0 on a monthly or daily basis. With this function, the administrator can avoid the need to manually reset the system.

The printer 3 has a clock function and can also keep track of the month and day of the week. The printer 3 may be configured to communicate with a clock server, not shown, via the network 5 to keep track of the month, day of the week. Alternatively, the printer 3 may define a period of time by counting every 30 days or every 24 hours, without having the concept of a month or day of the week.

Various settings manually entered via the Automatic Page Counter Reset function setting screen, which is one of administrator menu screens not shown in the figure, are stored in the authentication/restriction management Lib L1. The printer 3 resets each "Page Counters" at the timing specified in the settings stored in the authentication/restriction management Lib L1.

Each time each user prints one page, the "Total Page Counters" L133 and the "Color Page Counters" L132 are incremented. By performing the above input settings, when the "Total Page Counters" L133 and the "Color Page Counters" L132 reach the "Total Max. Pages" L122 and the "Color Max. Pages" L124, respectively, printing is disabled.

The administrator operates the "All Counter Reset" button B1 every month or uses the "Automatic Page Counter Reset" function. In this way, the "Total Page Counters" L133 and the "Color Page Counters" L132 will be set to zero, and the user can print again.

Modifications of the printing system 100 will be described below.

According to one modification, the server 4 may store the authentication/restriction management Lib (authentication/restriction management Lib) L1 in FIG. 2, the server 4 may have an EWS, and the administrator PC 1 may access the EWS of the server 4. In this case, the EWS control process shown in FIG. 4 indicates the process between the administrator PC 1 and the server 4, not between the administrator PC 1 and the printer 3. Therefore, in the modification, the job controlling process in FIG. 7 is the process of printer 3. In S32, the printer 3 communicates with the server 4 to obtain information on the authentication/restriction management Lib L1. In S37, the printer 3 communicates with the server 4 and instructs the server 4 to update the authentication/restriction management Lib L1.

According to another modification, the server 4 may store the authentication/restriction management Lib (authentication/restriction management Lib) L1 shown in FIG. 2, the server 4 may have an EWS, and the administrator PC1 may have access to the EWS of the server 4. The Job controlling process shown in FIG. 7 includes processes of the printer 3 and the processes of the server 4. The printer 3 transmits Job data obtained in S31 to the server 4. The server 4 obtains the page restriction information (S32) and performs the page count restriction checking process (S34). In the page count restriction checking process shown in FIG. 8, the server 4 transmits the notification data regarding S45-S46 and S48-S49 to the printer 3. In S46 and S49, the server 4 instructs the printer 3 to interrupt the job. When none of the notifications regarding S45-S46 and S48-S49 are necessary, i.e., no error has occurred, the server 4 transmits the notification data to continue the job to the printer 3.

The printer 3 starts the process for each Page in S33 and executes the Page printing in S36-S39 upon receipt of the notification data for continuing the job. In S37, however, the printer 3 communicates with the server 4 and instructs updating of the authentication/restriction management Lib L1.

When receiving the notification data of an error or job interruption, the printer 3 notifies to the function restricting process (FIG. 5) and interrupts the job.

The above-described modifications may be further modified in such a manner that the EWS may be provided to the printer 3, and for the reflection of the settings in S6 in FIG. 4 and the setting of the Count value to 0 in S14, the printer 3 communicates with the server 4 and instructs updating of the authentication/restriction management Lib L1.

If the administrator wishes to exceptionally release the page count restriction for a particular user during a month, the administrator can set the count of printed pages L13 to 0 by operating the Reset button B2, B3, or B4 for the user in question on the function restriction page RF. In this way, the user can print again without having to wait for the count of printed pages L13 to automatically reach 0.

According to the above configuration, it is possible to easily manage the count of printed pages for each user in the printer 3. That is, the administrator may use the function restriction page RF to easily perform each of setting of the count of printed pages L13 for each user ID to 0, changing of the "Max. Pages" L122 and L124 for each user ID, and setting of the count of printed pages for all the user IDs to 0. Therefore, the administrator can operate the restriction function precisely according to the situation during a one-month period.

For example, when printing relatively larger amount of pages during the current month is to be allowed only for a particular user, it is possible to set zero to the count of printed pages L13 for the user ID simply by operating the Reset buttons B1-B4 for the user ID. There is a way to increase the "Max. Pages" L122 and L124 for the user ID, but if more printing is to be allowed only for the current one-month period, then the "Max. Pages" L122 and L124 must be lowered for the next one-month period, which is troublesome for the administrator.

When adjusting the "Max. Pages" L122 and L124 of the pages to be printed, for the current one-month period and another one-month period in the future, it is only necessary to enter the concrete "Max. Pages" H212 and H232 for that user ID. When the printing of relatively larger amount of pages during the current month is to be allowed for each user, it is possible to set zero to the count of printed pages L13 for each user ID simply by operating the "All Counter Reset" button B1.

When the printer 3 receives a request from each process to obtain the following information from the authentication/restriction management Lib L1, the printer 3 returns the information to the process that made the request. If the printer 3, for example, receives a request from the requesting process to "obtain the Total Page Counters and the Color Page Counters of the login user," it returns the "Total Page Counters" L133 and the "Color Page Counters" L132 associated with the current login user name L111. At that time, the administrator can refer to the counter value returned from the printer 3 on the administrator PC 1 and use the same to consider whether or not to reset the printer 3 with the Reset button.

According to the above configuration, even though the count of printed pages L13 for the user ID has reached the "Max. Pages" L122 or L124, if any of the "Reset" buttons B2-B4 in the administrator PC 1 is operated, zero is set to the count of printed pages L13 and the printing related to the user ID becomes possible, thereby the printing can be performed.

According to the above configuration, when printing a relatively larger amount of pages during the current month is to be allowed only for a particular user, it becomes possible to set zero to the count of printed pages L13 for the user ID, and update the same from the set value of zero. In addition, the count of printed pages L13 of a user ID other than the above user ID will not be set to zero. When adjusting the upper limit of the count of printed pages within the current one-month period and another one-month period in the future, simply by inputting concrete "Max. Pages" H212 and H232 for the user ID, it is possible to change the "Max. Pages" L122 and L124 for the user ID other than the above user ID. Additionally, the "Max. Pages" L122 and L124 for the user ID other than the above user ID will not be changed without setting zero to the count of printed pages L13 for the above user ID.

According to the above configuration, by separating the user ID for using the printer 3 and the administrator ID for displaying the function restriction page RF for setting each user ID, usage of the printer 3 and management of the count of printed pages can be performed smoothly.

According to the above configuration, by separating the upper limit, operator, and counter values for the count of printed pages for each user into those for all printing and those for color printing, the count of printed pages can be managed not only for all printing, but also for color printing. The printing condition may be the size of the printing sheet to be printed. In this case, the count of printed pages for a specific sheet size can be managed.

According to the above configuration, the count of printed pages per user can be easily managed in the printer 3. In other words, the administrator can easily set zero to the count of printed pages L13 for each user ID using a single function restriction page RF, making it easy to operate the restriction function precisely according to the situation during a one-month period. For example, if printing of a relatively larger count of pages during the current month is allowed only for a particular user, the count of printed pages L13 for that user ID can be initialized simply by operating the Reset buttons B2 to B4 for the user ID.

According to the above configuration, the count of printed pages per user can be more easily managed in the printer 3. In other words, the administrator can easily change the Max. Pages L122 and L124 for each user ID using the function restriction page RF, making it easy to operate the restricted functions precisely according to the situation during a one-month period. For example, if the maximum count of printed pages is to be adjusted for a specific user from the current one-period to include a future one-month period, it is only necessary to enter the concrete Max. Pages H212 and H232 need only be entered.

The present disclosures are not limited to the above-described embodiment and modifications, and various changes are possible within the scope of the claims, and embodiments obtained by combining technical means disclosed in the different embodiments as appropriate are also included in the technical scope of the present disclosures.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer, comprising a memory and a controller,
wherein the printer has a function of restricting a number of printing during a particular period for each user ID;
wherein the controller is configured to perform:
starting a restriction period in accordance with an instruction from a user interface, the restriction period being a period in which the number of printing is restricted for each user ID;
storing an upper limit in the memory in response to starting the restriction period, the upper limit being an upper limit of the number of printing for each user ID;
when the restriction period is started, initializing a counter value of the number of printing for each user ID;
during the restriction period:
when printing is performed, updating the counter value which is stored in the memory and associated with a user ID corresponding to the printing;
when the counter value associated with the user ID reaches the upper limit, restricting printing corresponding to the user ID;
causing the user interface to display an operation screen including the upper limit for each user ID, an individual operator for each user ID, and a common operator common to each user ID;
when the individual operator is operated on the user interface, initializing the counter value associated with the user ID corresponding to the operated individual operator;
when an operation to input the upper limit for the user ID is made on the user interface, changing the upper limit stored in the memory to the inputted upper limit; and
when the common operator is operated on the user interface, initializing the counter value associated with each user ID.

2. The printer, according to claim 1,
wherein, after printing corresponding to the user ID, the controller is configured to perform, when the individual operator is operated on the user interface, initializing the counter value which is stored in the memory and associated with a user ID corresponding to the printing in such a manner that the printing corresponding to the user ID becomes possible.

3. The printer, according to claim 1,
wherein, the controller is configured to perform:
ending the restriction period in accordance with an instruction from the user interface;
in a case where the counter value, which is stored in the memory and associated with the user ID corresponding to the operated individual operator, is initialized when the individual operator is operated on the user interface, before the restriction period is ended, updating the counter value associated with the user ID corresponding to the operated individual operator from the counter value initialized in response to the individual operator being operated without changing the upper limit for the user ID corresponding to the operated individual operator and without initializing the counter value associated with a user ID other than the user ID corresponding to the operated individual operator; and
in a case where the upper limit, which is stored in the memory, is changed to the inputted upper limit when an operation to input the upper limit for user ID is made on the user interface, during the restriction period and after the restriction period is ended, controlling printing using the upper limit inputted on the user interface without initializing the counter value associated with the user ID for which the upper limit is input and without changing the counter value associated with a user ID other than the user ID for which the upper limit is inputted.

4. The printer, according to claim 1,
wherein the user ID is an ID used to use the printer, the counter value associated with a user ID logging in the printer being updated in accordance with printing corresponding to the user ID,
wherein, the controller is configured to perform causing the user interface to display the operation screen when an administrator ID is input on the user interface, and
wherein the administrator ID is an ID used to manage a number of printing for each user ID, initializing of the counter value and changing of the upper limit of the counter value for each user ID becoming possible by the administrator ID.

5. The printer, according to claim 1,
wherein the operation screen includes, for each user ID, a first upper limit of the number of printing without limiting a printing condition, a second upper limit of the number of printing with limiting the printing condition, a first operator associated with the printing without limiting the printing condition, and a second operator associated with the printing with limiting the printing condition,
wherein the controller is configured to perform:
when printing is performed, updating a first counter value of printing without limiting the printing condition corresponding to a used ID associated with the performed printing;
when the printing satisfies a particular printing condition, updating a second counter value of printing with limiting the printing condition stored in the memory;
when the first counter value reaches the first upper limit, restricting printing without limiting the printing condition and printing with limiting the printing condition; and
when the second counter value reaches the second upper limit, restricting printing with limiting the printing condition;
wherein, during the restriction period, the controller is configured to perform:
when the first operator is operated on the user interface, initializing the first counter value and the second counter value, which is stored in the memory, corresponding to a user ID associated with the operated first operator;
when the second operator is operated on the user interface, initializing the second counter value, which are stored in the memory, corresponding to a user ID associated with the operated second operator;
when an operation to input the first upper limit corresponding to a user ID is made on the user interface, changing the first upper limit, which is stored in the memory and associated with the corresponding user ID, to the inputted first upper limit; and
when an operation to input the second upper limit corresponding to a user ID is made on the user interface, changing the second upper limit, which is stored in the memory and associated with the corresponding user ID, to the inputted second upper limit.

6. The printer, according to claim 5,
wherein the printing condition is color printing.

7. A printer, comprising a memory and a controller,
wherein the printer has a function of restricting a number of printing during a particular period for each user ID;
wherein the controller is configured to perform:
starting a restriction period in accordance with an instruction from a user interface, the restriction period being a period in which the number of printing is restricted for each user ID;
storing an upper limit in the memory in response to starting the restriction period, the upper limit being an upper limit of the number of printing for each user ID;
when the restriction period is started, initializing a counter value of the number of printing for each user ID;
during the restriction period:
when printing is performed, updating the counter value which is stored in the memory and associated with a user ID corresponding to the printing;
when the counter value associated with the user ID reaches the upper limit, restricting printing corresponding to the user ID;
causing the user interface to display an individual screen including an individual operator for each user ID; and
when the individual operator is operated on the user interface, initializing the counter value associated with the user ID corresponding to the operated individual operator without changing the upper limit for the user ID corresponding to the operated individual operator and without initializing the counter value associated with a user ID other than the user ID corresponding to the operated individual operator, and
wherein, the controller is further configured to perform:
ending the restriction period in accordance with an instruction from the user interface; and
before the restriction period is ended, updating the counter value associated with the user ID from the counter value initialized in response to operating of the individual operator.

8. The printer, according to claim 7,
wherein, the controller is configured to perform:
when an operation to input an upper limit for user ID is made on the user interface, changing the upper limit, which is stored in the memory, to the inputted upper limit, and applying the upper limit input on the user interface during the restriction period and after the restriction period is ended without initializing the counter value associated with the user ID for which the upper limit is input and without changing the counter value associated with a user ID other than the user ID for which the upper limit is inputted.

9. The printer, according to claim 7,
wherein the individual screen includes, for each user ID, a first upper limit of the number of printing without limiting a printing condition, a second upper limit of the number of printing with limiting the printing condition, a first operator associated with the printing without limiting the printing condition, and a second operator associated with the printing with limiting the printing condition,
wherein the controller is configured to perform:
when printing is performed, updating a first counter value of printing without limiting the printing condition corresponding to a used ID associated with the performed printing;
when the printing satisfies a particular printing condition, updating a second counter value of printing with limiting the printing condition stored in the memory;
when the first counter value reaches the first upper limit, restricting printing without limiting the printing condition and printing with limiting the printing condition; and
when the second counter value reaches the second upper limit, restricting printing with limiting the printing condition;
wherein, during the restriction period, the controller is configured to perform:
when the first operator is operated on the user interface, initializing the first counter value and the second counter value, which are stored in the memory, corresponding to a user ID associated with the operated first operator;
when the second operator is operated on the user interface, initializing the second counter value, which are stored in the memory, corresponding to a user ID associated with the operated second operator;
when an operation to input the first upper limit corresponding to a user ID is made on the user interface, changing the first upper limit, which is stored in the memory and associated with the corresponding user ID, to the inputted first upper limit; and when an operation to input the second upper limit corresponding to a user ID is made on the user interface, changing the second upper limit, which is stored in the memory and associated with the corresponding user ID, to the inputted second upper limit.

10. The printer, according to claim 9, wherein the printing condition is color printing.

11. A printing system, comprising a terminal, a server, and a printer connected through a network to each other,
wherein the server comprises a memory and a controller, wherein the controller is configured to perform:
starting a restriction period in accordance with an instruction from the terminal through the network, the restriction period being a period in which a number of printing is restricted for each user ID;
storing an upper limit in the memory in response to starting the restriction period, the upper limit being an upper limit of the number of printing for each user ID;
when the restriction period is started, initializing a counter value of the number of printing for each user ID;
during the restriction period:
when the printer performs printing, updating the counter value which is stored in the memory and associated with a user ID corresponding to the printing;
when the counter value associated with the user ID reaches the upper limit, restricting printing corresponding to the user ID;
causing the terminal to display an operation screen including the upper limit for each user ID, an individual operator for each user ID, and a common operator common to each user ID;
when the individual operator is operated on the terminal, initializing the counter value associated with the user ID corresponding to the operated individual operator;
when an operation to input the upper limit for the user ID is made on the terminal, changing the upper limit stored in the memory to the input upper limit; and
when the common operator is operated on the terminal, initializing the counter value associated with each user ID.

12. A printing system, comprising a terminal, a server, and a printer connected through a network to each other,
wherein the server comprises a memory and a controller, wherein the printer has a function of restricting a number of printing during a particular period for each user ID;
wherein the controller is configured to perform:
starting a restriction period in accordance with an instruction from the printer through the network, the restriction period being a period in which a number of printing is restricted for each user ID;
storing an upper limit in the memory in response to starting the restriction period, the upper limit being an upper limit of the number of printing for each user ID;
when the restriction period is started, initializing a counter value of the number of printing for each user ID;
during the restriction period:

when the printer perform printing, updating the counter value which is stored in the memory and associated with a user ID corresponding to the printing;
when the counter value associated with the user ID reaches the upper limit, restricting printing corresponding to the user ID;
causing the terminal to display an individual screen including an individual operator for each user ID;
when the individual operator is operated on the terminal, initializing the counter value associated with the user ID corresponding to the operated individual operator without changing the upper limit for the user ID corresponding to the operated individual operator and without initializing the counter value associated with a user ID other than the user ID corresponding to the operated individual operator; and
before the restriction period is ended, updating the counter value associated with the user ID from the counter value initialized in response to operating of the individual operator.

13. A printing system, comprising a terminal, a server, and a printer connected through a network to each other,
wherein the server comprises a memory and a controller, wherein the printer has a function of restricting a number of printing during a particular period for each user ID;
wherein the controller is configured to perform:
starting a restriction period in accordance with an instruction from the printer through the network, the restriction period being a period in which a number of printing is restricted for each user ID;
storing an upper limit in the memory in response to starting the restriction period, the upper limit being an upper limit of the number of printing for each user ID;
when the restriction period is started, initializing a counter value of the number of printing for each user ID;
during the restriction period:
when the printer perform printing, updating the counter value which is stored in the memory and associated with a user ID corresponding to the printing;
when the counter value associated with the user ID reaches the upper limit, restricting printing corresponding to the user ID;
causing the terminal to display an individual screen including at least one user ID, and an individual operator for each user ID;
when the individual operator is operated on the terminal, initializing the counter value associated with the user ID corresponding to the operated individual operator without changing the upper limit for the user ID corresponding to the operated individual operator and without initializing the counter value associated with a user ID other than the user ID corresponding to the operated individual operator; and
before the restriction period is ended, updating the counter value associated with the user ID from the counter value initialized in response to operating of the individual operator.

* * * * *